(No Model.)
C. SHIELDS.
PIPE COUPLING.
No. 514,734. Patented Feb. 13, 1894.
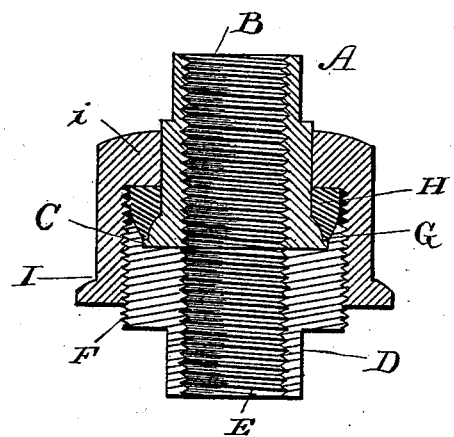
Witnesses
Thos. E. Robertson
W. E. Clendaniel
Inventor
Christopher Shields
By T. J. W. Robertson
Attorney
THE NATIONAL LITHOGRAPHING COMPANY.
WASHINGTON, D. C.

UNITED STATES PATENT OFFICE.

CHRISTOPHER SHIELDS, OF PHILADELPHIA, PENNSYLVANIA.

PIPE-COUPLING.

SPECIFICATION forming part of Letters Patent No. 514,734, dated February 13, 1894.

Application filed August 21, 1893. Serial No. 483,675. (No model.)

*To all whom it may concern:*

Be it known that I, CHRISTOPHER SHIELDS, a citizen of the United States of America, residing at Philadelphia, in the county of Philadelphia and State of Pennsylvania, have invented certain new and useful Improvements in Pipe-Couplings, of which the following is a specification, reference being had therein to the accompanying drawing.

This improvement relates to that class of couplings used to join metallic pipes, such as gas and steam pipes, but the coupling may be used for other purposes; and the invention consists in the peculiar construction, arrangement and combinations of parts hereinafter more particularly described and then definitely claimed.

In the drawing appended hereto, which shows a vertical section of my coupling, A represents the smaller or male end of the coupling, having an internal thread B and a flange C, the latter having one of its sides flat and its other end inclined and slightly convex.

At D is shown the female or larger end of the coupling, provided with interior and exterior threads, marked E and F, respectively, and its large end cupped out as shown at G to receive the flange of the male coupling A. At H is shown a packing ring of soft metal, having its lower edge tapered and fitting between the inclined edges of the cup G and flange C. Screwed on the female section D is a nut I, having a flange *i* of the usual form, which presses down upon the top of the ring H. With this construction, the nut I, as it is screwed on the section D, forces down the tapered portion of the packing ring between the inclined edges of the male section and the convex edge of the female section, which makes a perfectly tight fit that is unaffected by any amount of heat short of that sufficient to melt the packing ring.

The following are some of its advantages: First. More effective than any other, for the following reason: The greater the expansion of the pipes, the better the joint, because the soft metal ring rests between the flange and the edge of the cup, thus causing, in case of expansion or stretching of the pipe, the metal ring to be pressed more firmly into place and pressing the flat places together, thus contributing to still further close the joint. Second. As the flat faces of the two sections fit very closely, a comparatively tight joint is made at that point, thus leaving little work for the metal ring to do. Third. Owing to the soft metal ring having a rounded edge on the side facing the flange of the male section, the union can be easier placed in position in the event of the pipes being a little out of line. Fourth. As the soft metal ring is chambered in between two faces, there is no chance of its wasting away by escaping and consequently the ring is likely to last very much longer than any other in present use.

What I claim as new is—

1. In a coupling, a male section A having a flange with inclined edge and flat face, and a female section cupped out to receive the male section, and having a flat face constructed and arranged to come in contact with the face of the male section, in combination with a packing ring arranged outside of the body of the male section and having a tapering edge, and a device acting directly on the packing ring for forcing its tapering edge into contact with the edges of the cup and flange, substantially as described.

2. The coupling herein described and shown, comprising the male section A having a flange with an inclined edge, a female section, cupped out to form an inclined edge and adapted to receive the section A, a soft metal packing ring H having tapering edges, and a nut I provided with a flange *i* to press down the packing between the inner edge of the cup and the outward edge of the flange; all substantially as shown and described.

In testimony whereof I affix my signature, in presence of two witnesses, this 17th day of August, 1893.

CHRISTOPHER SHIELDS.

Witnesses:
JAMES BAILY,
HENRY J. CRIPPEN.